Dec. 30, 1930.  A. COPONY  1,786,736
DECKING DEVICE FOR FREIGHT CARS
Filed Feb. 24, 1930
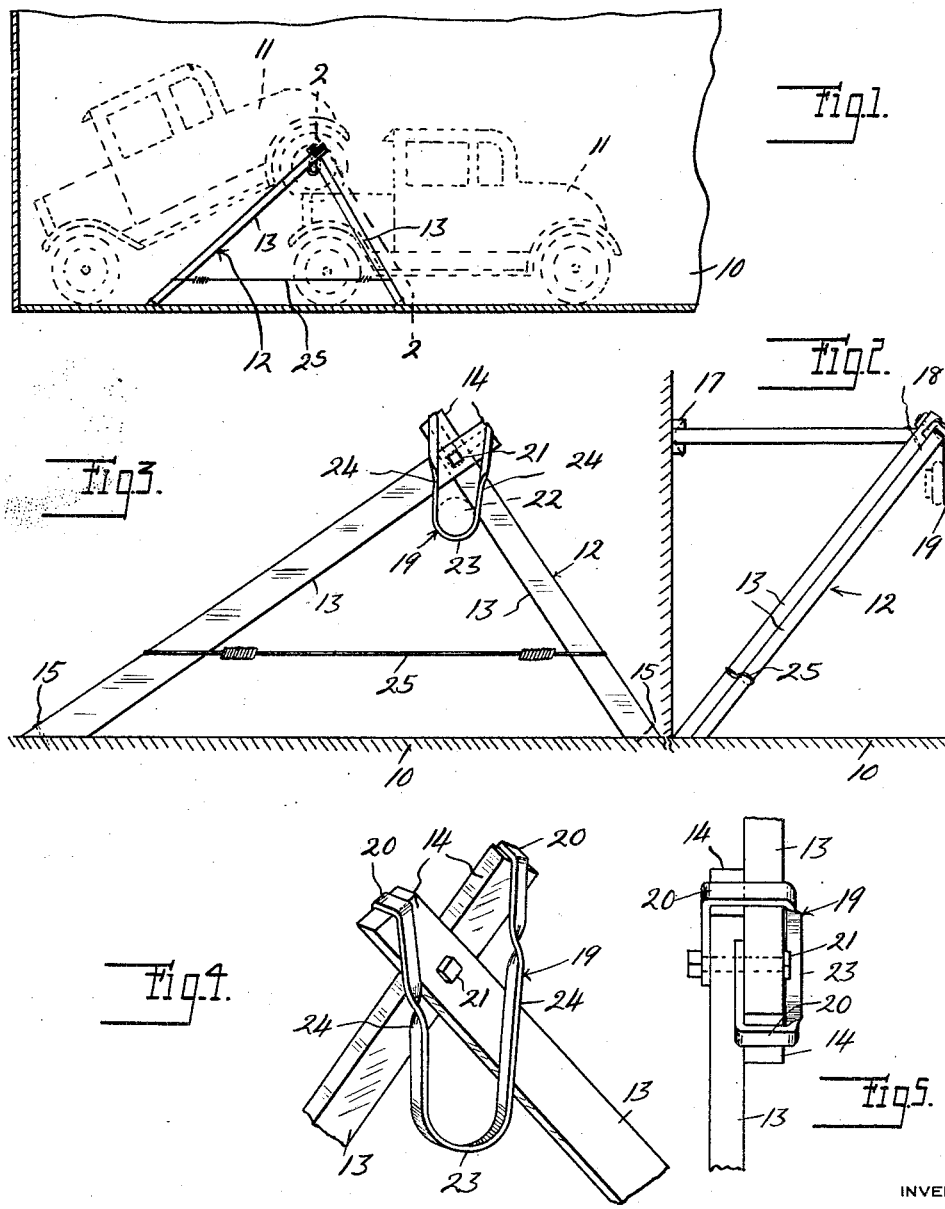
INVENTOR
Alfred Copony
BY Whittemore Hulbert
Whittemore & Belknap
ATTORNEYS Patented Dec. 30, 1930

1,786,736

UNITED STATES PATENT OFFICE

ALFRED COPONY, OF MOUNT CLEMENS, MICHIGAN, ASSIGNOR TO COPONY AUTO LOADING COMPANY, OF DETROIT, MICHIGAN, A CORPORATION OF MICHIGAN

DECKING DEVICE FOR FREIGHT CARS

Application filed February 24, 1930. Serial No. 430,889.

This invention relates to automobile decking devices particularly adapted for half-decking automobiles and the like in freight cars and the like. Heretofore decking devices of this general character have been relatively difficult to assemble and disassemble and were of such a character as to make it economically necessary to disassemble the decking devices with care and to return the same to the shipper.

In accordance with my present invention, I have provided a decking device which may be economically constructed; which is distinguished by its simplicity; which may be assembled and disassembled with facility; and which is of such a character as to make it economically expedient to return to the shipper only the saddle portion thereof.

The above and other objects, advantages and novel details of construction of my invention will be made more apparent as this description proceeds, especially when considered in connection with the accompanying drawings wherein Figure 1 is a fragmentary vertical sectional view of a freight car showing the application of my improved decking devices;

Figure 2 is an enlarged sectional view taken substantially on the plane indicated by line 2—2 in Figure 1;

Figure 3 is a side elevational view of one of the decking devices;

Figure 4 is a fragmentary perspective view of the upper end of one of the decking devices, and Figure 5 is a top plan view of that portion of the structure illustrated in Figure 4.

Referring now more particularly to the drawings wherein like reference characters indicate like parts, it will be noted that in Figure 1 there is illustrated a fragment of a freight car or the like 10 in which it is proposed to half-deck automotive vehicles 11, substantially in the manner illustrated. For this purpose a pair of decking devices 12 are associated with one of the axles of the vehicle, one at each end thereof.

As seen more clearly in Figures 2 to 5 inclusive, each decking device comprises a pair of flat members 13 having their upper ends 14 engaging one another in a crossed or intersecting relation. The lower ends of the frame members 13 are fastened to the floor of the freight car or the like, as for instance, by shoes or blocks or by toe-nailing the same thereto as indicated at 15. It is generally customary, in decking devices of this character, to arrange the frame members 13 at an outer inclined angle with respect to the side wall of the freight car, see particularly Figure 2, and thus there is generally provided a horizontal brace having one end fixed to the wall of the freight car as at 17, and the other end fixed to the upper end of the supporting frame 12, as for instance, by toe-nailing the same thereto as indicated at 18. The reference character 19 indicates a saddle member which is preferably, although not necessarily, made out of a flat metal strap. Each end of the saddle member is bent to provide a frame member embracing portion 20 which is adapted to embrace the frame member substantially on opposite sides and the end thereof, as most clearly illustrated in Figures 4 and 5. The extremities of the saddle member 19 are perforated to receive a fastening member in the form of a bolt or the like 21, which is passed through the superposed ends 14 of the frame members and through the said apertures in the saddle member. Thus, the saddle member is removably attached to the frame members and the frame members are detachably secured together by the same single fastening member 21.

It will be noted that the saddle strap 19 extends over the upper ends of the frame members so that when the axle or hub 22 of the automobile is engaged in the saddle portion 23 of the saddle strap, the weight is taken principally by the ends of the frame members 13. If the saddle strap is formed of flat stock as illustrated herein, the broad side thereof may be presented to the axle of hub by half twisting the two legs of the saddle strap as indicated at 24.

It is also preferable, although not essential, that the frame members 13 be connected at a point spaced from the upper ends thereof by means of a flexible tension member herein shown in the form of a wire 25.

From the foregoing construction it will be readily apparent that the frame members 13 may be quickly assembled and disassembled and that the saddle member may be readily removed when the structure is disassembled. Thus, the saddle members may be preserved and returned to the shipper while the remainder of the structure can be scrapped.

The present form of construction is distinguished by its simplicity, cheapness and the ease with which it may be constructed and knocked down. However, various changes in many of the non-essential details of construction may suggest themselves to those skilled in this art and to this end reservation is made to make such changes as may come within the purview of the accompanying claims.

What I claim as my invention is:

1. In a decking device for automobiles or the like in freight cars, a pair of downwardly diverging frame members having their upper ends intersecting one another, a saddle strap having its ends engaging respectively the said ends of said frame members, and a fastening element extending through the intersecting ends of said frame members and the ends of said saddle strap.

2. In a decking device for automobiles, a pair of downwardly diverging frame members having their upper ends engaging one another, a saddle strap having its end portions respectively embracing the ends of said frame members and a single fastening element extending through the engaging portions of said frame members and through said saddle strap for maintaining said parts in assembled relation.

3. In a decking device for automobiles or the like in freight cars, a pair of downwardly diverging frame members having their upper ends overlapping one another, a saddle strap having its ends shaped to extend respectively over the ends of said frame members and to engage the frame members on opposite sides adjacent the ends thereof, the ends of said saddle strap overlapping, and a fastening element extending through the overlapping portions of said frame members and saddle strap for the purpose set forth.

4. In a decking device for automobiles or the like in freight cars, a pair of downwardly diverging frame members having their upper ends overlapping one another, a saddle strap having its ends shaped to extend respectively over the ends of said frame members and to engage the frame members on opposite sides adjacent the ends thereof, the ends of said saddle strap overlapping, a fastening element extending through the overlapping portions of said frame members and said saddle strap, said saddle strap having a portion intermediate its ends for supporting the hub of an automobile.

5. In a decking device for automobiles, a pair of downwardly diverging frame members having their upper ends engaging in overlapping relation, a saddle strap having its ends shaped to substantially embrace respectively the upper ends of said frame members and having an intermediate hub receiving saddle portion suspended between said frame members and a fastening element extending through the overlapping portions of said frame members for securing said frame members together.

6. In a decking device for automobiles, a pair of engaging frame members, a saddle strap having its ends engaging said frame members and having an intermediate hub receiving saddle portion supported in a suspended position by said frame members, and a single fastening element for securing the ends of said saddle strap to said frame members.

In testimony whereof I affix my signature.

ALFRED COPONY.